United States Patent [19]
Mueller et al.

[11] Patent Number: 4,909,344
[45] Date of Patent: Mar. 20, 1990

[54] ARRANGEMENT FOR THE DRIVE OF A MOTOR VEHICLE

[75] Inventors: Robert Mueller, Moensheim; Klaus Gausrab, Ostfildern, both of Fed. Rep. of Germany

[73] Assignee: Porsche Aktiengesellschaft, Weissach, Fed. Rep. of Germany

[21] Appl. No.: 268,715

[22] Filed: Nov. 9, 1988

[30] Foreign Application Priority Data

Nov. 9, 1987 [DE] Fed. Rep. of Germany ....... 3738008

[51] Int. Cl.$^4$ ............................................. B60K 23/08
[52] U.S. Cl. ..................................... 180/247; 180/248; 180/197
[58] Field of Search ................ 180/247, 248, 249, 197; 74/710.5, 711

[56]     References Cited
U.S. PATENT DOCUMENTS

| 2,791,130 | 5/1957 | Boughner | 74/695 |
| 3,327,822 | 6/1967 | Spencer | 192/84 |
| 4,595,087 | 6/1986 | Morisawa et al. | 180/247 |
| 4,691,593 | 9/1987 | Mueller | 180/249 |
| 4,744,435 | 5/1988 | Schnurer | 180/247 |
| 4,757,728 | 7/1988 | Pitsch | 180/248 |

FOREIGN PATENT DOCUMENTS

| 3317247 | 11/1984 | Fed. Rep. of Germany . |
| A3708193 | 10/1987 | Fed. Rep. of Germany . |
| 3507490 | 2/1988 | Fed. Rep. of Germany . |
| 2139972 | 11/1984 | United Kingdom . |

Primary Examiner—David M. Mitchell
Assistant Examiner—Donn McGiehan
Attorney, Agent, or Firm—Barnes & Thornburg

[57]     ABSTRACT

In order to be able to use a four-wheel drive of a motor vehicle for different vehicle types without significant changes, it is combined into a compact drive unit. For that purpose, a four-wheel-locking mechanism and a free-wheel device with by-pass clutch are arranged adjacent one another and coaxially to one another inside of a housing surrounding the same which is adapted to be flangedly connected to an axle housing of the motor vehicle.

14 Claims, 3 Drawing Sheets

ARRANGEMENT FOR THE DRIVE OF A MOTOR VEHICLE

BACKGROUND AND SUMMARY OF THE INVENTION

The present invention relates to an arrangement for the drive of a motor vehicle, with a permanently operating four-wheel drive lock-up mechanism arranged in the drive connection front axle-rear axle, with a free-wheeling device and with an engageable by-pass clutch for the free-wheeling device.

Such a drive arrangement is described in the DE-OS No. 33 17 247. The wheels of the front axle are driven permanently and directly by an engine transmission block arranged at the front axle. The drive to the rear axle takes place by means of a viscous coupling disposed in the longitudinal drive connection between the front axle and the rear axle which automatically transmits a driving torque corresponding to the rotational speed difference between the front axle and the rear axle. In order to attain a torque decoupling with a braked vehicle and to improve the driving stability, a free-wheeling device is additionally inserted into the drive connection. When driving the motor vehicle in the reverse or backward direction, a four-wheel drive is also achieved in that a by-pass or bridging clutch is disposed in parallel to the free-wheeling device which is engaged when driving backwards and thus cancels the decoupling from the front axle to the rear axle.

It is the object of the present invention to make such a drive arrangement utilizable by a special constructive design of the drive arrangement essentially without change, for motor vehicles of the most varied type of construction without having to undertake any significant structural changes in these motor vehicles.

The underlying problems are solved according to the present invention in that the four-wheel-locking mechanism and the free-wheeling device together with the by-pass clutch are arranged adjacent one another and coaxially to one another inside of a housing surrounding the same which is adapted to be flangedly connected to an axle housing of the motor vehicle. If the lock-up mechanism together with the free-wheeling device and the by-pass clutch are surrounded coaxially to one another by a cylindrical housing, a compact four-wheel drive unit can be realized which can be installed into the front axle, the rear axle or the longitudinal drive connection of different vehicle types. Preferred as four-wheel-lock-up mechanism is a planetary gear with a brake acting on the planet carrier as described in the DE-PS No. 35 07 490.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
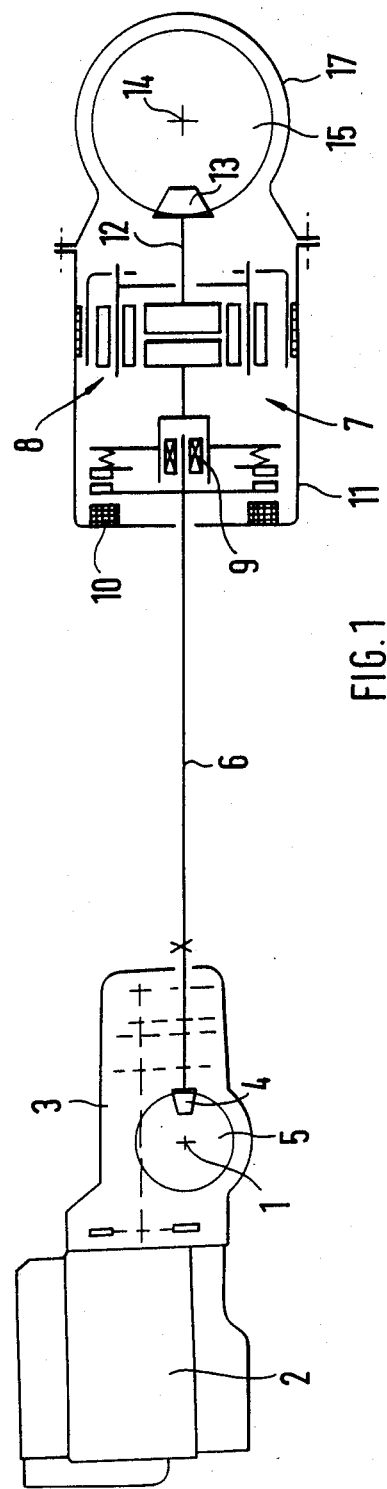
FIG. 1 is a schematic drive arrangement of a motor vehicle in accordance with the present invention.
Figure 2:
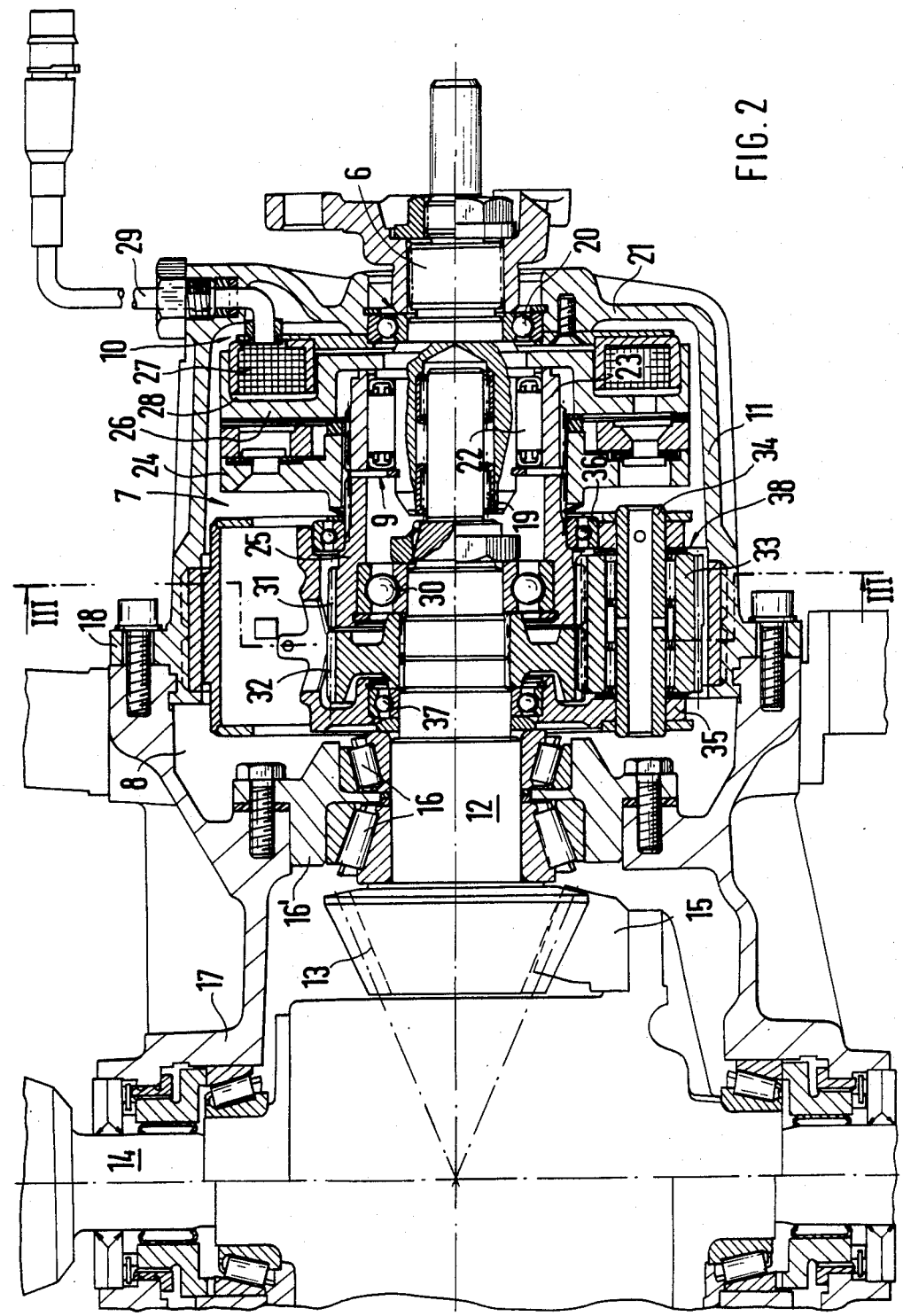
FIG. 2 is a longitudinal cross-sectional view through the four-wheel drive unit in accordance with the present invention.
Figure 3:
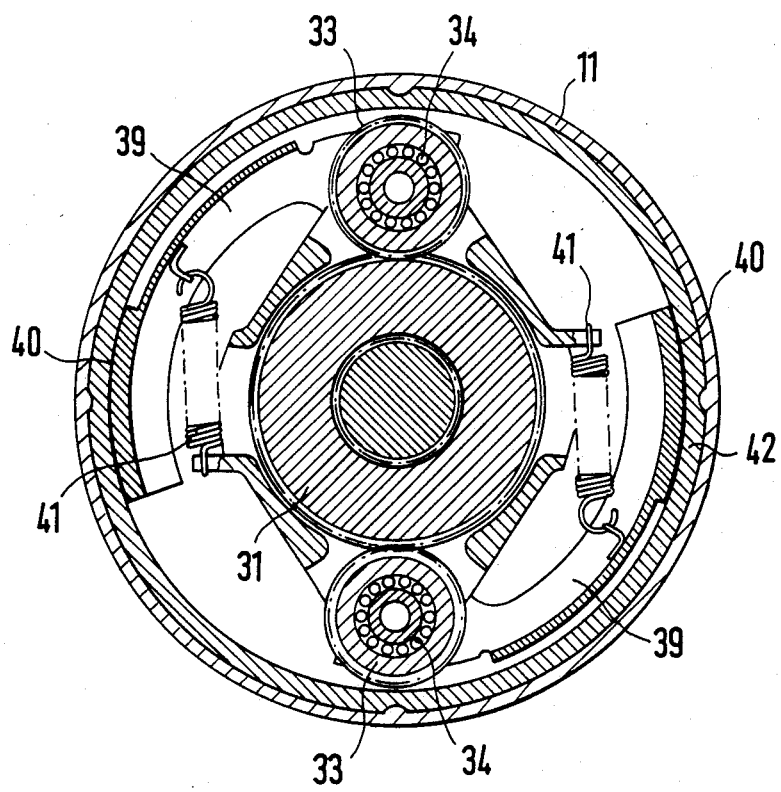
FIG. 3 is a cross-sectional view taken along line III—III of FIG. 2.

Referring now to the drawing wherein like reference numerals are used throughout the various views to designate like parts, a driving engine 2 arranged near the front axle 1 in a motor vehicle drives the front axle 1 by means of a change-speed transmission 3 attached thereto by way of a bevel gear and a drive bevel gear or differential bevel gear 5. A drive shaft 6 extends from the bevel gear 4 to a drive unit generally designated by reference numeral 7 which consists of a four-wheel-locking mechanism generally designated by reference numeral 8, of a free-wheeling device 9 connected ahead of the same and of an electromagnetically actuated by-pass clutch 10 connected in parallel to the free-wheeling device 9 and of a housing 11 surrounding all of the drive elements. An output shaft 12 of the four-wheel-locking mechanism 8 carries end-face a bevel pinion 13, by means of which a drive bevel gear 15 attached at the rear axle 14 is driven. The output shaft 12 is supported within the area of the bevel pinion 13 in conical roller bearings 16 (FIG. 2) of a bearing sleeve 16' which is flangedly connected to the axle housing 17 of the rear axle 14. Concentrically thereto, the housing 11 is also threadably secured by means of a flange 18 at the axle housing 17 so that the drive unit 7 containing all functionally important parts is adapted to be installed at the rear axle 14 as compact component.

At its other end, the output shaft 12 is centrally supported in the drive shaft 6 in two needle bearings 19. The drive shaft 6 itself is supported in a ball bearing 20 which is secured in the end-face wall 21 of the housing 11. The free-wheeling device 9 consisting of clamping rollers 22 which is arranged on the drive shaft 6 within the area of the needle bearings 19, is in torque-transmitting connection with a clutch disk 24 of the by-pass clutch 10 by way of a sleeve 23 with spline teeth surrounding the same. This clutch disk 24 is also connected by way of spline teeth with an input shaft 25 of the four-wheel locking mechanism 8. During normal operation, the clamping rollers 22 of the free-wheeling device 9 are in the locking position and transmit the torque of the drive shaft 6 to the locking mechanism 8. There is a split of power between the front wheels and the back wheels and there is no lock of the differential. If the rear wheels suddenly spin and hence over speed the input shaft 6, the rollers 22 disconnect the drive due to the over-running and until speed equalibrium is again obtained, power is only directed to the front wheels. If during braking the output shaft 12 rotates faster than the drive shaft 6, then the locking action at the free-wheeling device 9 also is cancelled due to the over-running of gear 23 which releases rollers 22. The output shaft 12 is decoupled from the drive shaft 6 and the four-wheel drive locking mechanism 8 becomes inoperable.

When driving the motor vehicle backwards, if the drive shaft 6 rotates in the reverse direction, the locking action at the free-wheeling device 9 is also lifted. In order to permit also in that situation for the four-wheel-locking mechanism 8 to become operable, a second clutch disk 26 is disposed opposite the clutch disk 24, which is secured on the drive shaft 6. Both clutch disks 25 and 26 are provided with teeth at their mutually facing end surfaces. If an annularly shaped electromagnet 27 which is secured at the housing 11 and protrudes with a substantial air gap on all sides into an annular recess 28 at the end-face of the clutch disk 26, is connected to the voltage by way of an electric line 29, then the clutch disk 24 is attracted toward the clutch disk 26 against the spring force. The end-face teeth of the two clutch disks 24 and 26 engage form-lockingly, one within the other. The rotary movement of the drive shaft 6 is now transmitted to the input shaft 25 of the four-wheel-lock-up mechanism 8 by way of the now closed by-pass clutch 10 in by-passing relationship of the free-wheeling device 9. This occurs because clutch plate 26 is in driving connection directly with clutch plate 24, connected to the input of gear 25, and drive through rollers 22 is not necessary. The fact that the rollers 22 do not drive in a reverse direction does not affect the four wheel drive in reverse. As indicated, rollers 22 act as a conventional one way drive from shaft 6 to shaft 12 via gear 23 clutch 24 and gear 25 clutch, when the speed of gear 23 is less than the speed of the drive from shaft 6 to rollers 22. In reverse, the rollers 22 cannot drive. Hence the parallel path by the direct connection of clutch plates 24 and 25 is necessary. The application of the voltage to the electromagnet 27 and the closing of the by-pass clutch 10 can take place automatically during the engagement of the reverse speed by a built-in key switch.

The input shaft 25 to the four-wheel-locking mechanism 8 which is constructed as hollow shaft, is supported on the output shaft 12 by means of a ball bearing 30. The input shaft 25 is provided along its outer surface with a toothed arrangement that serves as input sun gear 31 of a planetary gear 38. Adjacent the input sun gear 31, an input sun gear 32 is non-rotatably provided on the output shaft 12 coaxially to the input sun gear 31. The outer diameters of the two sun gears 31 and 32 are approximately equal; however, the output sun gear 32 has an outer diameter with up to four teeth more than the input sun gear 31. Planet gears 33 are in meshing engagement with both sun gears 31 and 32. The planet gears 33 are supported on bearing bolts 34 which are secured on both sides in a planet carrier 35. The planet carrier 35 is supported on the input shaft 25 on a ball bearing 36 and on a ball bearing 37 of the output shaft 12. Brake shoes 39 constructed as flyweights are rotatably supported on the bearing bolts 34 which with their brake linings 40 frictionally abut at a brake drum 42 of the housing 11 against the force of springs 41 and thus brake the planet carrier 35.

If, for example, as a result of slippage on ice, the front axle 1 rotates faster than the rear axle 14, then the planet carriers 35 and with the same, the brake shoes 39 are set into rotation with a transmission ratio of about 16 : 1 to the differential rotational speed front axle-rear axle. The brake shoes 39 frictionally engaging at the brake drum 42 of the housing 11 produce a resistance which has as a consequence a torque transmission to the rear axle 14. By reason of the high transmission ratio and the poor gear efficiency connected therewith the braking torque to be produced is so slight that a centrifugal brake of small volume suffices which, together with the free-wheeling device 9 and the by-pass clutch 10, is accommodated space-savingly in the cylindrical housing 11. For the adaptation to different vehicle types, only the mass of the brake shoes 39 has to be slightly varied. All other parts of the drive unit 7 can remain unchanged.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for the drive of a motor vehicle, comprising a permanently operating four-wheel drive locking means arranged between a vehicle transmission and a rear axle drive connection and in front of the rear axle drive connection, free-wheeling means drivingly connecting the transmission with the rear axle drive connection as long as rear axle drive speed does not exceed transmission drive speed, an engageable by-pass clutch means for drivingly connecting the transmission to the rear axle drive connection as a by-pass drive of the free-wheeling means, and housing means for housing the drive arrangement, the four-wheel locking means and the free-wheeling means together with the by-pass clutch means being arranged adjacent to one another and coaxially to one another inside of the housing means surrounding the same, and the housing means being flangedly connected to an axle housing of the motor vehicle.

2. An arrangement according to claim 1, wherein the drive arrangement is located adjacent one of the front axle or rear axle.

3. An arrangement according to claim 1, wherein the arrangement is located in alignment with a longitudinal output shaft connection of the motor vehicle transmission to a front axle and a rear axle and wherein the housing means is flangedly connected to an axle housing of the rear axle.

4. An arrangement according to claim 1, wherein the by-pass clutch means includes two clutch disks provided with tooth means at end-faces thereof and wherein said tooth means are form-lockingly connected to ensure a drive there-between by engagement of an electromagnet means.

5. An arrangement according to claim 4, wherein one clutch disk of the by-pass clutch means is non-rotatable on a drive shaft, which drive shaft is rotatingly connected by way of the free-wheeling means with an input shaft of the four-wheel locking means, and wherein the other clutch disk is non-rotatably mounted relative to the input shaft.

6. An arrangement according to claim 5, wherein the electromagnet means is secured at the housing means and is arranged with a lateral air gap in an end-face annular recess of the one clutch disk of the by-pass clutch means, and wherein the tooth means of the other clutch disk is forced into engagement with the tooth means of the one clutch disk by the electromagnetic means upon application of current to the electromagnet means.

7. An arrangement according to claim 1, wherein an output shaft of the four-wheel drive locking means is provided with a bevel pinion which together with a drive bevel gear forms an angle drive from the four-wheel drive locking means to the axle to be driven.

8. An arrangement according to claim 7, wherein the output shaft is supported in a concentric bearing of a drive shaft leading from the transmission to the drive assembly and in conical roller bearings which are secured in a bearing sleeve flangedly connected to the axle housing.

9. An arrangement according to claim 1, wherein the four-wheel drive locking means includes a planetary gear means having planet carrier means and brake shoe means which rotate together with the planet carrier means to exert a braking moment on the planet carrier means at a brake drum of the housing means.

10. An arrangement according to claim 8, wherein the by-pass clutch means includes two clutch disks provided with tooth means at end-faces thereof and wherein said tooth means are form-lockingly connected to ensure a drive there-between by engagement of an electromagnet means.

11. An arrangement according to claim 10, wherein one clutch disk of the by-pass clutch means is non-rotatable on a drive shaft, which drive shaft is rotatingly connected by way of the free-wheeling means with an input shaft of the four-wheel locking means, and wherein the other clutch disk is non-rotatably mounted relative to the input shaft.

12. An arrangement according to claim 11, wherein the electromagnet means is secured at the housing means and is arranged with a lateral air gap in an end-face annular recess of the one clutch disk of the by-pass clutch means, and wherein the tooth means of the other clutch disk is forced into engagement with the tooth means of the one clutch disk by the electromagnetic means upon application of current to the electromagnet means.

13. An arrangement according to claim 11, wherein the four-wheel drive locking means includes a planetary gear means having planet carrier means and brake shoe means which rotate together with the planet carrier means to exert a braking moment on the planet carrier means at a brake drum of the housing means.

14. An arrangement according to claim 13, wherein the arrangement is located in alignment with a longitudinal output shaft connection of the motor vehicle transmission to a front axle and a rear axle and wherein the housing means is flangedly connected to an axle housing of the rear axle.

* * * * *